United States Patent [19]

Kollross

[11] Patent Number: 4,917,003
[45] Date of Patent: Apr. 17, 1990

[54] PISTON TO ROD MOUNTING ASSEMBLY

[75] Inventor: Robert J. Kollross, Wausau, Wis.

[73] Assignee: J. I. Case Company, Racine, Wis.

[21] Appl. No.: 217,600

[22] Filed: Jul. 11, 1988

[51] Int. Cl.⁴ .............................................. F16J 1/04
[52] U.S. Cl. ...................................... 92/220; 92/216;
92/256; 403/108
[58] Field of Search ................. 92/255, 256, 216, 217,
92/218, 219, 220; 285/81, 91; 403/108, 378,
379, 320

[56] References Cited

U.S. PATENT DOCUMENTS

| 1,416,232 | 5/1922 | Osborn | 285/91 X |
| 2,589,482 | 3/1952 | Downey | 403/379 |
| 3,885,461 | 5/1975 | Crisp et al. | 92/255 X |
| 4,089,253 | 5/1978 | Visser | 92/255 X |
| 4,443,144 | 4/1984 | Defrancq | 403/379 X |

Primary Examiner—Edward K. Look
Attorney, Agent, or Firm—Dykema Gossett

[57] ABSTRACT

A hydraulic cylinder, piston and rod assembly wherein the piston is secured to the rod in an efficient and inexpensive manner. The piston includes a threaded interior which is secured to a corresponding threaded portion on the end of the piston rod. An opening through a portion of the piston is aligned with a recess within the end portion of the piston rod to permit the insertion of a locking pin into the aligned openings. Thereafter, a compression ring, which is pivotally attached to the locking pin, is slipped into a complementary groove that is provided on the exterior periphery of the piston end portion. This provides a positive connection between the rod and piston which tolerates dimensional variations and eliminates play.

1 Claim, 1 Drawing Sheet

U.S. Patent
Apr. 17, 1990
4,917,003
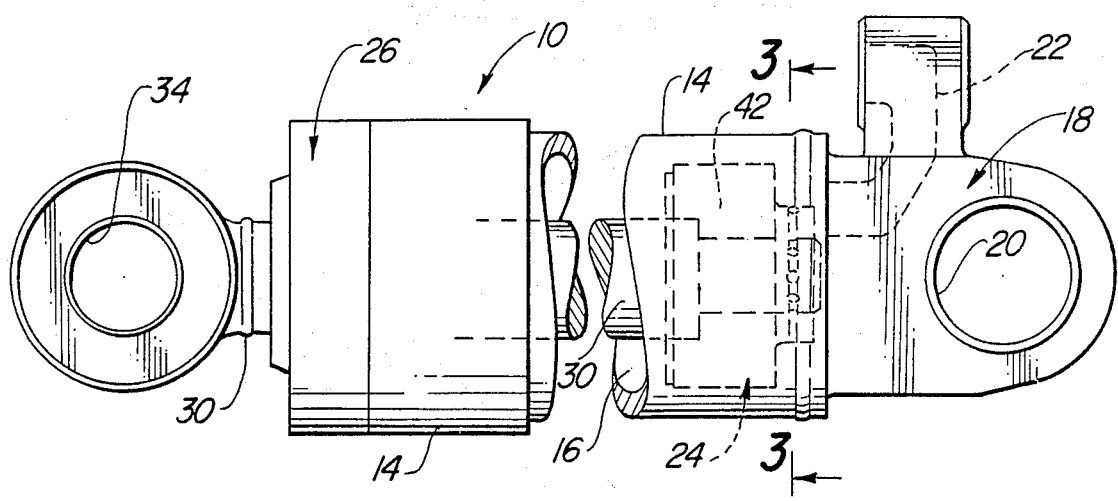
*Fig-1*
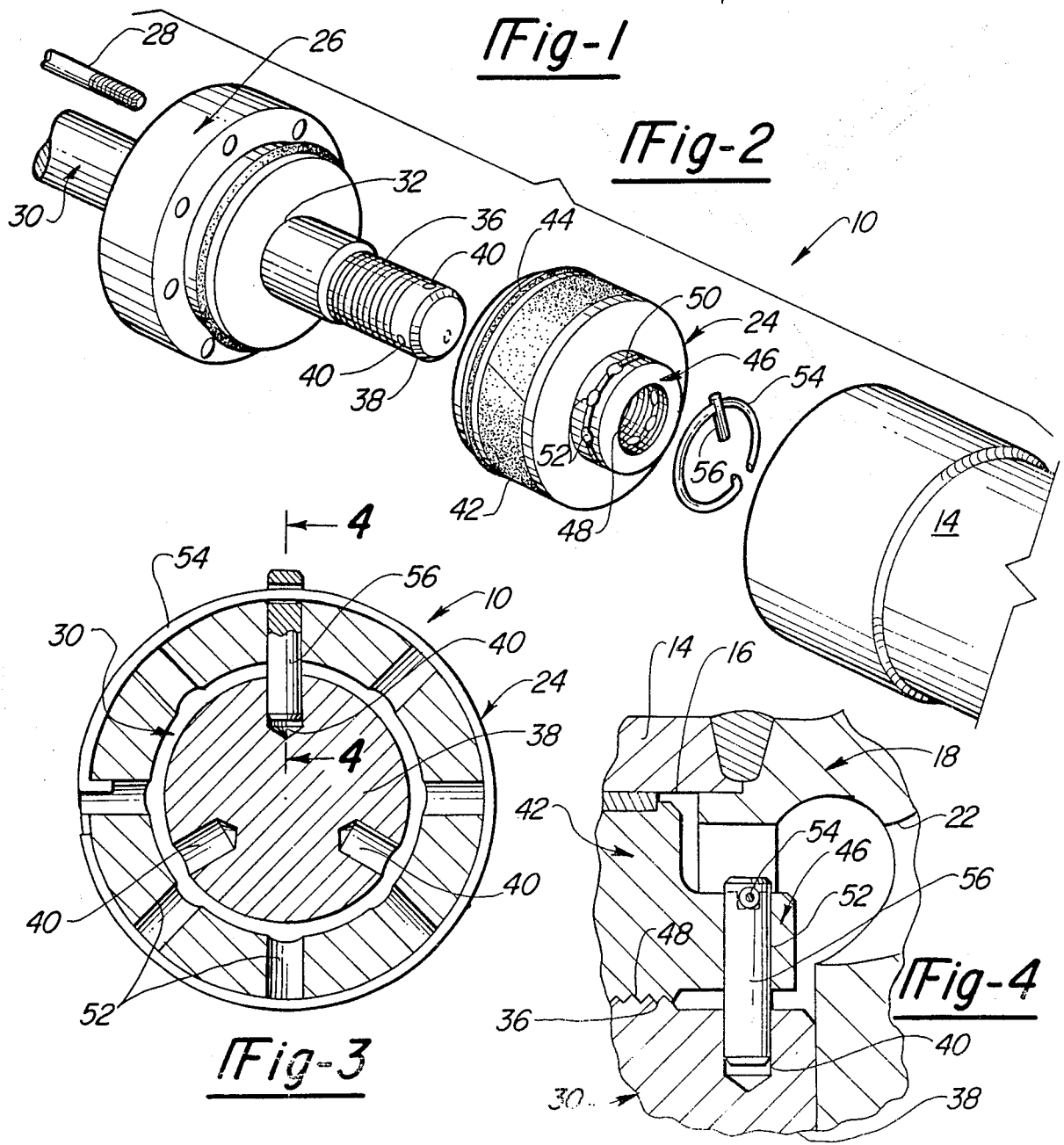
*Fig-2*
*Fig-3*
*Fig-4*

PISTON TO ROD MOUNTING ASSEMBLY

BACKGROUND OF THE INVENTION

This invention relates to a hydraulic cylinder and piston assembly, and more specifically, this invention is concerned with the securement of a piston assembly to a piston rod.

A conventional method of attaching a piston rod to a piston is by means of a piston pin. The piston pin allows the piston to maintain alignment in the cylinder bore while permitting some angular displacement of the piston rod. However, in hydraulic cylinders that are used on earthworking equipment and the like, it is conventional to pivotally mount the cylinder to a frame with the end of the piston rod being pivotally mounted to a reactive member. Thus, it is not necessary that the piston be pivotally mounted to the piston rod, and therefore, several types of attaching means have been developed for connecting the piston to its rod.

In hydraulic cylinders of the type described hereinabove, it is common to have one end of the piston rod threaded for the purpose of receiving an internally threaded piston or a nut that is tightened after the piston is located on the rod. A problem with this type of assembly is that considerable torque is necessary to assure the attachment of the piston to the piston rod, thereby requiring special tools and substantial labor. Another method of attaching a piston to a piston rod is to use a split ring and multiple part piston arrangement. The cost of this type of piston to rod assembly is high due to the necessity of extensive machining operations for the piston and piston rod seals.

Thus, it is a principal object of the present invention to provide a simple and economical piston and piston rod assembly which avoids the complex and costly attaching means that have been utilized heretofore.

SUMMARY OF THE INVENTION

There is disclosed herein a hydraulic actuator which includes a cylinder that is closed at one end in a leakproof manner by an end cap. The end cap is provided with an inlet port to allow the passage of fluid into the cylinder between the end cap and the piston assembly. The opposite end of the cylinder is closed by a removable end wall assembly which is secured to the cylinder by suitable means such as bolts. Another vent opening is provided in the removable end wall assembly so that pressurized fluid may be admitted to one end of the actuator while the other end is vented in order to drive the piston assembly in a desired direction.

A piston rod extends axially within the cylinder through a central passage in the removable end wall assembly. The piston rod includes an inner end that has both a threaded portion and an unthreaded portion. The unthreaded end portion includes a plurality of circumferentially spaced holes or recesses which are used for securing the piston assembly in accordance with the teachings of the present invention.

The piston assembly includes an outer portion which is in sealing engagement with the inner surface of the cylinder. Further, the assembly includes an inner portion having a threaded interior which is secured onto the threaded portion of the piston rod. Moreover, the exterior periphery of the inner portion of the piston assembly includes a groove and a plurality of spaced apart openings therethrough. The final component of the piston assembly comprises a compression ring which is pivotally attached to a locking pin.

In operation, the piston assembly is secured to the piston rod by turning the piston assembly until its threaded interior bottoms out on the threaded portion of the piston rod. This may be accomplished manually or with a conventional spanner wrench. Thereafter, an opening through the inner portion of the piston assembly is aligned with one of the recesses in the unthreaded end portion of the piston rod. The locking pin is then inserted through the openings and the compression ring is fitted into the groove on the inner portion of the piston assembly.

The present invention does not require fixturing or special assembly tools. A simple tool, such as a screwdriver, may be used to remove the compression ring and locking pin. Thus, the present invention provides a simple and economical means for assembling or disassembling the piston and piston rod.

Other advantages and meritorious features of the present invention will be more fully understood from the following detailed description of the invention, the appended claims, and the drawings, a brief description of which follows.

BRIEF DESCRIPTION OF THE DRAWINGS

FIG. 1 is a side elevational view, partly in cross-section, of the hydraulic actuator having the piston assembly of the present invention.

FIG. 2 is a perspective assembly view of the hydraulic actuator illustrated in FIG. 1.

FIG. 3 is a cross-sectional view taken along line 3—3 of FIG. 1.

FIG. 4 is a cross-sectional view taken along line 4—4 in FIG. 3.

DETAILED DESCRIPTION OF THE INVENTION

Referring now to FIGS. 1-4, there is shown a hydraulic actuator 10 which includes a cylinder 14 having an inner surface 16. The cylinder is closed at one end by end cap 18 which is secured in a leakproof manner to cylinder 14 by means of welding. The end cap 18 is provided with a mounting means such as eyelet 20. Further, an inlet port 22 is provided in end cap 18 to allow the passage of fluid into the cylinder between the end cap 18 and the piston assembly which is generally shown as 24.

The opposite end of cylinder 14 is closed by a removable end wall assembly 26 which is secured to cylinder 14 by suitable means such as bolts 28. A vent (not shown) that is similar to inlet port 22 is provided in end wall assembly 26 such that pressurized fluid may be admitted to one end of actuator 10 while the other end is vented in order to drive piston assembly 24 in a desired direction, as is conventional.

A piston rod 30 extends axially within cylinder 14 through a central passage 32 in end wall 26 and through an annular seal (not shown) within the assembly such that rod 30 may be reciprocated without fluid leakage. As shown, piston rod 30 includes an attaching eye 34 on one end with its opposite end including both a threaded portion 36 and an unthreaded end portion 38. End portion 38 includes a plurality of circumferentially spaced holes or recesses 40 which are used for securing piston assembly 24 in place, as will hereinafter be described.

The piston assembly 24 includes an outer portion 42 having an O-ring type seal 44 mounted on its circumference for sealing engagement with the inner surface 16 of cylinder 14. An inner portion 46 of piston assembly 24 includes a threaded interior 48 which may be screwed onto the threaded portion 36 of piston rod 30. Further, the exterior periphery of portion 46 includes a groove 50 and a plurality of spaced apart openings 52. The final component of piston assembly 24 comprises a compression ring 54 which is pivotally attached to a locking pin 56.

In operation, piston assembly 24 is secured to piston rod 30 by rotating assembly 24 until its threaded interior 48 bottoms out on the threaded portion 36 of piston rod 30. This may be done manually or with a conventional spanner wrench. After the piston assembly is tightened onto the threaded portion 36 of piston rod 30, the operator locates the opening 52 which is closest to one of the holes or recesses 40 in piston rod end portion 38. The piston assembly 24 is then rotated slightly to align opening 52 with hole 40 to permit the insertion of locking pin 56. Thereafter, compression ring 54 is slipped into the groove 50 on the exterior periphery of piston assembly portion 46, thereby securing piston assembly 24 on piston rod 30.

The present assembly provides an efficient and inexpensive means for securing piston assembly 24 to piston rod 30 without the need for special tools or fixturing. The removal of the piston assembly 24 from piston rod 30 may be accomplished by using a conventional screwdriver to remove the compression ring 54 and locking pin 56. A conventional spanner wrench may then be used to turn the piston assembly 24 for removing it from piston rod 30 with minimal effort.

Thus, it is apparent that there has been provided in accordance with this invention a hydraulic piston rod assembly that meets the objectives of the invention as previously set forth. While the invention has been described in conjunction with a specific embodiment thereof, it is evident that other alternatives and modifications will be apparent to those skilled in the art in light of the foregoing description. Accordingly, it is intended that such alternatives and variations are embraced and fall within the spirit and scope of the appended claims.

I claim:

1. A piston and piston rod assembly for reciprocation within a cylinder comprising:

a removable end wall assembly secured to one end of said cylinder;

a piston rod having a portion that is threaded and an unthreaded end portion having a plurality of circumferentially spaced recesses therein, said piston rod extending through said removable end wall assembly;

an annular piston having an outer larger diameter portion which is in sealing engagement with an inner wall of said cylinder and an inner smaller diameter portion having a threaded interior which mates with the threaded portion of said piston rod;

said inner portion of said piston includes an exterior periphery which extends from a face of said outer portion, and said exterior periphery having a groove and a plurality of spaced openings therein;

means for connecting the end portion of said piston rod to the inner portion of said piston; and said connecting means includes a locking pin which extends through one of said openings in said piston inner portion into one of said recesses in said piston rod end portion, a compression ring pivotally attached to said locking pin, and said compression ring engages said groove in the exterior periphery of the inner portion of said piston.

* * * * *